Jan. 15, 1963 G. L. LAVRARD 3,073,414
COLLAPSIBLE LADDER
Filed May 24, 1961 3 Sheets-Sheet 1
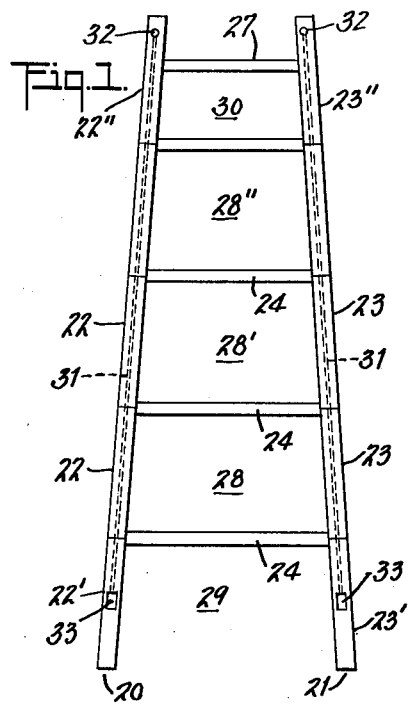
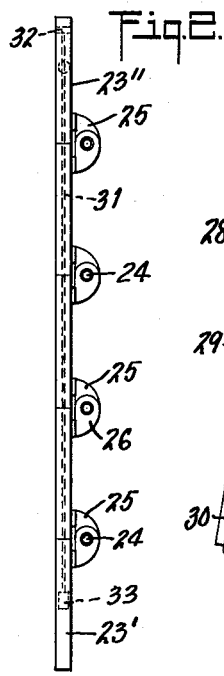
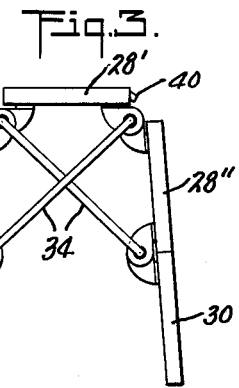
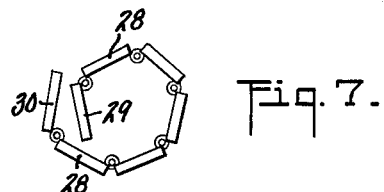
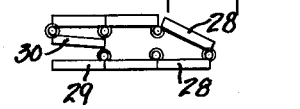
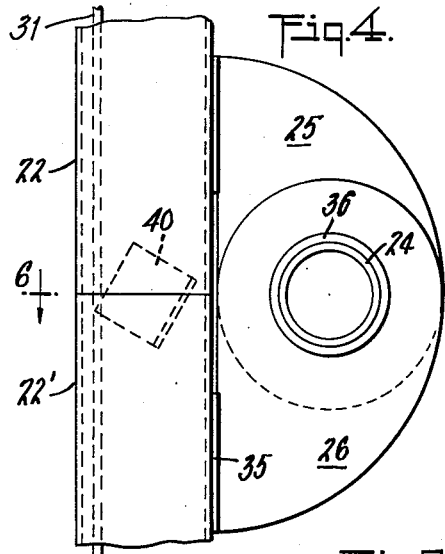
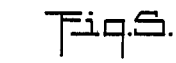
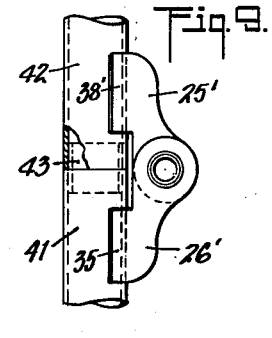
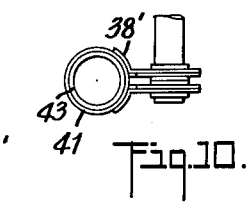
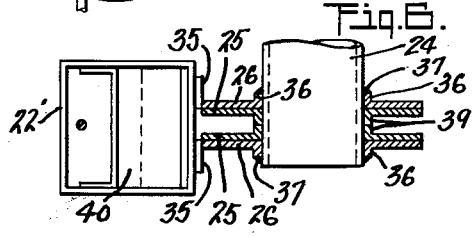
INVENTOR.
GEORGES LOUIS LAVRARD
BY *Walter S. Bleston*
ATTORNEY Jan. 15, 1963 G. L. LAVRARD 3,073,414
COLLAPSIBLE LADDER
Filed May 24, 1961 3 Sheets-Sheet 2
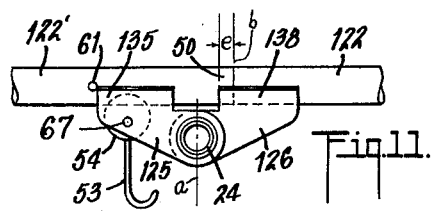
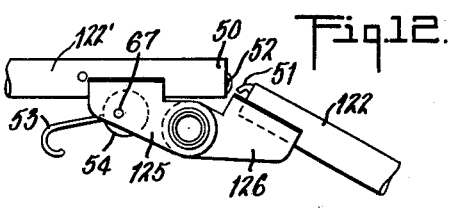
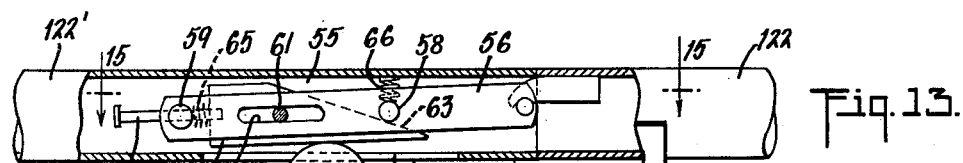
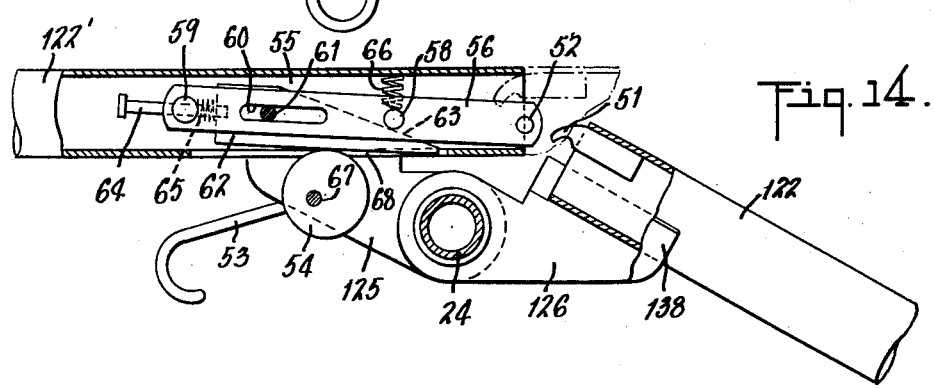
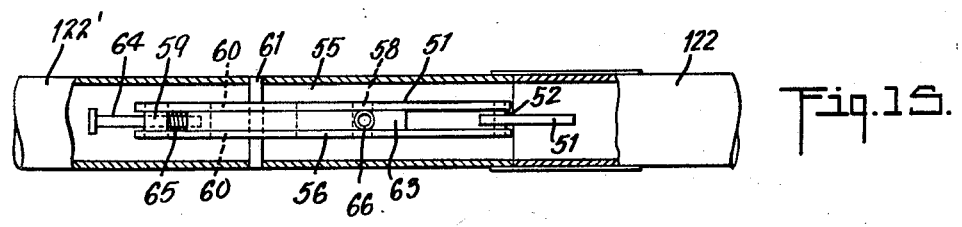
INVENTOR.
GEORGES LOUIS LAVRARD
BY Walter S. Olerton
ATTORNEY Jan. 15, 1963    G. L. LAVRARD    3,073,414
COLLAPSIBLE LADDER
Filed May 24, 1961    3 Sheets-Sheet 3
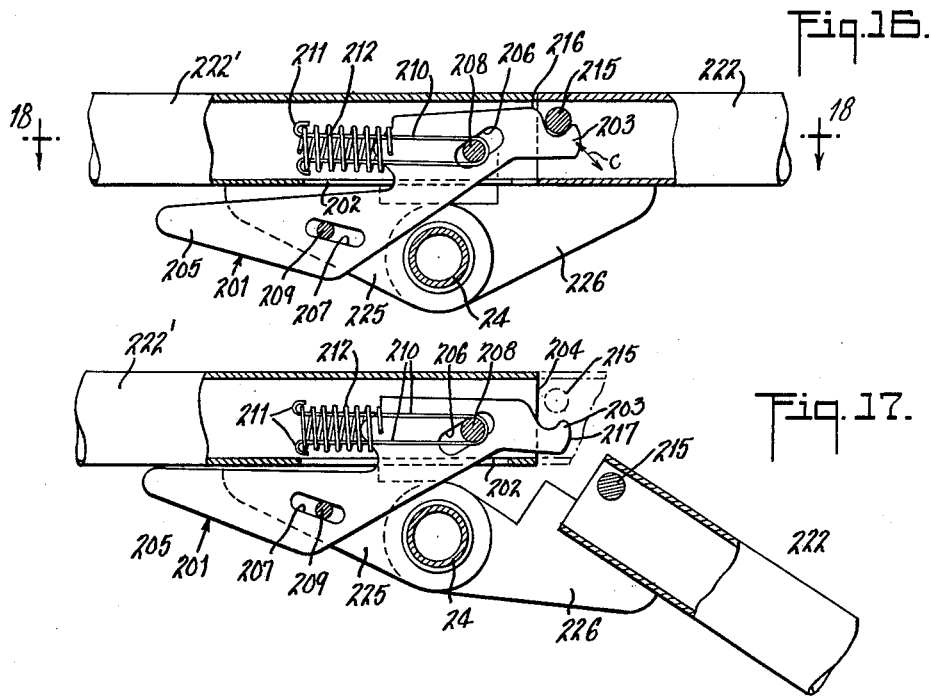
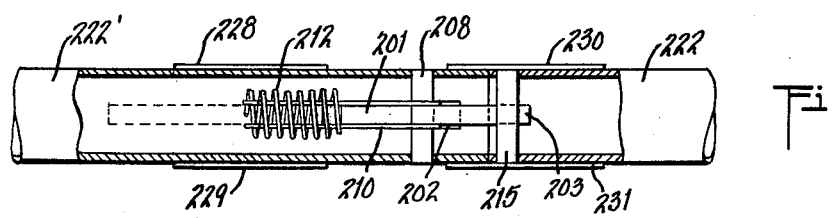
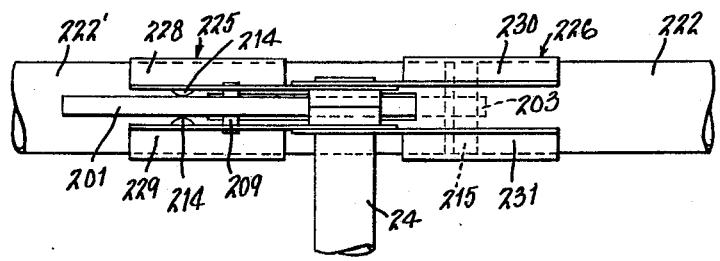
INVENTOR.
GEORGES LOUIS LAVRARD
BY Walter S. Bleston
ATTORNEY

United States Patent Office 3,073,414
Patented Jan. 15, 1963

3,073,414
COLLAPSIBLE LADDER
Georges Louis Lavrard, 36 Ave. du President Wilson, Chatellerault, France
Filed May 24, 1961, Ser. No. 112,330
Claims priority, application France June 15, 1960
8 Claims. (Cl. 182—164)

The invention relates to a collapsible ladder. The conventional ladders of wood or metal comprising two side beams connected by transverse rungs, consist of one piece and are cumbersome to carry on account of their long extension. Moreover, in many instances they are difficult to erect and to remove when used in connection, e.g. with trapdoors or wherever the space is limited.

The invention aims to overcome the drawback of the conventional structures and to provide a ladder which may be folded or coiled when not in use, or during transport, so as to reduce the bulkiness and thus to meet the requirements wherever a reduced volume is indispensable.

The invention also aims to provide a ladder an end portion of which can be folded over in the event of the fully erected ladder being too long.

Another object of the invention is the provision of a ladder the side beams of which consist of a plurality of relatively short bars each of which being of a length substantially equal to the spacing of a pair of consecutive rungs, wherein each pair of bars on the same level is connected by a rung and hinged to the adjoining pair of bars so that the rung constitutes the hinge axle.

A further object of the invention contemplates the provision of stiffening or locking means whereby the ladder sections, each of which comprises one pair of side bars and a rung, can be erected to the total length of the ladder and secured in the extended position.

According to another object of the invention the multi-sectioned ladder can be set up in various ways as, e.g. in the form of a step ladder with legs of equal or different lengths or in the form of a flat or table-like middle portion supported by two stepped leg portions.

It is also an object of the invention to provide a locking device between each two adjoining sections which comprises a rocking lever or element capable of moving in two directions in order, on the one hand, to close the lock and on the other hand, to take up automatically any play remaining in the locking device and the elements thereof, wherein preferably the rocking lever is movable in two different directions.

Further obejcts and details of the invention will be apparent from the description given hereinafter and the accompanying drawing illustrating several embodiments thereof by way of example.

In the drawing:

FIGS. 1 and 2 are front and side elevations, respectively, of a ladder according to the invention in the fully erected position, FIG. 3 is a side elevation of the same ladder in the form of a step ladder, FIG. 4 is a side elevation of a hinge between two sections on a larger scale, FIG. 5 is a view from the rear of the hinge of FIG. 4, FIG. 6 is a section along line 6—6 of FIG. 4, FIG. 7 is an illustration of the ladder in a coiled condition, FIG. 8 is an illustration of the ladder when folded substantially flat, FIG. 9 is a side elevation partly in section of a hinged pair of modified sections, FIG. 10 is a top plan view of a ladder portion shown in FIG. 9, FIGS. 11 and 12 are side elevations of another form of a section hinge in locked and open positions, respectively, FIGS. 13 and 14 are sectional views on an enlarged scale of the hinge in the positions respectively as in FIGS. 11 and 12, FIG. 15 is a section along line 15—15 of FIG. 13, FIGS. 16 and 17 are views similar to FIGS. 13 and 14, respectively, of a modified hinge, FIG. 18 is a section along line 18—18 of FIG. 16, and FIG. 19 is a rear elevation of the hinge of FIGS. 16–18.

Referring now to the drawing, FIGS. 1 to 8 illustrate a ladder which according to the invention has, in the fully erected state two continuous side beams 20 and 21 shown as of a metal tube of square cross-section, as clearly apparent from FIG. 6. However, it will be clear that other cross-sections are useful and that other materials, such as wood, may be used. The beams are divided in a plurality of short part beams or bars 22 and 23, respectively. The bars 22 and 23 have a length equal to the spacing of rungs 24 except for the ends of the ladder where the bars 22′, 22″, 23′ and 23″ may have another length. Each two adjoining bars are articulated or hinged to each other and the hinge axes are located in the rear of the bars to the ends of which the hinge elements 25 and 26 are secured by any conventional means (not shown), such as riveting or welding. The hinge elements 25 affixed to the upper bar ends are located on the inside of the hinge elements 26 on the lower bar ends and the preferably tubular rungs 24, constituting the hinge axles, are secured with their ends, e.g. by welding to the outer hinge elements 26. The end bars 22′ and 23′ have only a hinge element 26 whereas the end bars 22″ and 23″ have only a hinge element 25. A topmost rung 27 may be welded or otherwise affixed between the top bars 22″ and 23″ in order to ensure that these bars can move only in unison when the ladder is being folded, as described hereinafter with respect to FIGS. 7 and 8.

Now it will be clear that the illustrated ladder comprises a plurality of middle sections, namely sections 28, 28′, 28″, a lower end section 29 and an upper end section 30, wherein each middle section includes a bar 22, a bar 23, hinge elements 25 and 26 on each bar and a rung 24, whereas the bottom section 29 includes bars 22′, 23′, hinge element 26 and a rung 24 and the top section 30 includes bars 22″, 23″, hinge element 25 and the rung 27. It will be noticed that in the illustrated ladder the beams 20 and 21 converge towards the top. Consequently, the rungs 24 are of upwardly decreasing lengths. Furthermore, the hinge elements 25 and 26 are shown directed parallel to the bars. This may cause a slight distortion of the elements 25 and/or 26 when the sections are folded in relation to each other, as in FIGS. 7 and 8 unless the hinge elements are turned from the start into planes parallel to the longitudinal central plane of the ladder, i.e. at right angles to the rungs. However, as the prevailing angles are very small no trouble with respect to the position of the hinge elements need be expected. Of course, if a ladder according to the invention has parallel beams 20 and 21, the length of all the rungs will be the same and no distortion of the hinge element can occur nor need any allowance be made for any non-parallelism of the folded bars.

The ladder correctly positioned, i.e. with the rungs in the rear of the bars, will be fully erected when loaded, that means, any bend between two adjoining ladder sections will straighten out as a torque will be set up in the hinges urging the adjoining bars to abut with their ends against each other. However, there are instances where it is desired to prevent any undesired bending of the sections with respect to each other. For this reason a stretching means may be provided which, in the illustrated embodiment, is a wire rope, indicated schematically at 31 within each beam 20 and 21. Each rope is secured with its one end inside the respective top bar at 32 and with its other end to a stretching means schematically indicated at 33 at the bottom bar.

The ladder can be used not only in the erected position of FIG. 1, but also in other forms e.g. in the form of a step ladder, as in FIG. 3. In order to secure such position, rods 34 may be provided and inserted with their bent ends into the open ends of the tubular rungs 24 in an arrangement as shown.

FIGS. 4, 5 and 6 illustrate on a larger scale a hinge between the adjoining bars 22 and 22'. The same design of hinges may be used for the connection of all the other pairs of adjoining bars. Each hinge element 26 consists of two symmetrical sheet metal pieces bent to form a foot 35 secured by means not shown e.g. by riveting or welding to the bar 22', as seen in FIG. 5. The hinge element is provided with a circular flange 36 through which the rung 24 is passed with its end and to which the rung is welded at 37. Similarly, the hinge element 25 consists of two pieces each provided with a foot 38 and a hub forming flange 39 through which the rung 24 is freely passed and which is located between the parts of the hinge element 26. In order to guide adjoining bars into a properly aligned position, an insert piece may be secured in the end of one of the bars so as to project therefrom to be engaged by the end of the other adjoining bar. Such guide piece is shown as a piece 40 of channel-shaped cross-section which is secured with its lower portion 40' in the bar 22' and which projects with its upper portion 40" from that bar into the bar 22.

Now it will be clear that a ladder according to my invention is particularly well suited for use where space is limited or for transportation, as it can be coiled as in FIG. 7 or folded substantially flat as in FIG. 8. In both these figures, ladders of a larger number of sections than in FIG. 1 are illustrated. It will also be clear that the ladder can be shortened by folding over one or several of the end sections.

FIGS. 9 and 10 show a hinged connection of two bars 41 and 42, similar to that of FIGS. 4 to 6 with the difference, however, that the bars are of circular rather than square cross-section. In consequence the feet 35' and 38' of the hinge elements 25' and 26' are curved so as to fit the bar surfaces. Furthermore, the guide piece 43 comparable to the piece 40 is of round tubular cross-section.

The invention further contemplates the provision of means for mechanically locking the hinged sections in the erected position of the entire ladder or of only a plurality of sections depending on the use to be made of the structure. If such locking means are provided the wire ropes 31 of FIG. 1 will neither be required nor desirable. Furthermore, it is merely necessary to provide the hinges of one of the beams 20, 21 with locking means as one-sided locking will secure the whole respective sections in the erected position. The several hinges of one of the beams will have to be equipped with separate locking means which secure two adjoining ladder sections, by manual operation or automatically when they are being straightened out from a bent or folded position into the aligned or erected position in which rigidity of the locked hinges is assured. The structure is such that the locked hinges can be unlocked by an easy grip of the user's hand.

In the embodiment of FIGS. 11 to 15 the locking is accomplished by a hook affixed to one of the ends of a bar and by a coupling component engageable by the hook and articulated at the adjacent end of the adjoining bar wherein the coupling component is a rocking lever adapted to move in a path having two components in order to accomplish, on the one hand, the closing of the locking device and, on the other hand, an automatic elimination of any play which may remain between the hook and coupling component in the closed position of the locking means.

The arrangement of the hinge elements 125 and 126 on the bars 122' and 122 are similar to the elements 25 and 26, respectively, particularly shown in FIGS. 4 to 6. However, the arrangement is such that the ultimate end portion 50 of the bar 122' projects beyond the axial plane $a$ of the hinge axle, i.e. the rung 24. As the feet 135 and 138 of the elements 125 and 126, respectively, extend equally far from the plane $a$ the foot 138 projects freely a distance $c$ from the ultimate end of the bar 122. Therefore, in the position of FIG. 11 the ultimate end portion 50 of the bar 122' nests in the projecting portion of the foot 138 which thus constitutes an abutment for the bar 122' in the aligned position of the bars. It will also be noted that the joining plane $b$ of the two bars 122 and 122' is out of line with regard to the articulation plane $a$ so as to form a lever tending to align the bars when the rung 24 is loaded and to increase the rigidity of the ladder in proportion to the increase of the support load.

A hook 51 projecting from the end of the bar 122 is secured within the latter, as clearly visible in FIG. 12 where the bars are in a non-aligned position in relation to each other. The hook in cooperation with a coupling pin 52 of the coupling component described later on renders it possible to lock the bars 122 and 122' in the aligned position of FIG. 11. The locking and releasing from the locked position of the bars can be accomplished by manipulation of a lever 53 which turns an eccentric 54, further described with reference to FIGS. 13 to 15. The coupling component, in general denoted by 55, is arranged inside the end of bar 122' and comprises an elongated member formed of two metal strips 56 and 57 jointed together in a somewhat spaced relationship by three pins, namely, the aforementioned pin 52 and the additional pins 58 and 59. The strips 56 and 57 are provided each with a longitudinally extending slot 60 through which is passed a pin 61 which is secured with both its ends in the wall of the bar 122'. A wedge piece 62, also provided with a corresponding longitudinal slot, through which pin 61 passes, is arranged between the strips 56 and 57 and bears with its tongue end 63 against the pin 58. A screw 64 is freely passed through an opening in the pin 59 and screwed into the opposite end of the wedge 62. A compression spring 65 surrounding the screw 64 is inserted between the wedge and the pin 59. The coupling component comprising the parts 52 to 65 is so arranged inside the bar 122' that it can rock about the pin 61 as pivot and that the component 55 with associated part can also shift lengthwise on that pin. Another spring 66 is arranged between the pin 58 and the wall of the bar so as to tend to push the component 55 downward. The locking device is controlled by the aforementioned lever 53 and eccentric 54 of which the latter is pivoted on the hinge element 125 about a pin 67 and engages the wedge 62 through a longitudinal slot 68 in the wall of the bar 122'. By moving the lever 53 from the position of FIG. 14 into that of FIG. 13 the wedge 62 and therewith the whole component 55 will be shifted against the restraint of spring 66.

The locking device of FIGS. 11 to 15 operates in the following manner:

When the two bars 122 and 122' are in the non-aligned position of FIGS. 12 and 14 the component 55 with the pin 52 is pushed down by spring 66 while lever 53 is in a position substantially parallel to the bar 122'. In order to lock the bars 122 and 122' together, the bar 122 or bar 122' is so turned about the hinge axle that both bars are properly aligned. Thereupon the lever 53 will be turned into the position of FIGS. 11 and 13, i.e. in a position at right angles to the bar 122'. Thereby the eccentric 54 will raise the wedge 62 which in turn will raise the member 56, 57 owing to the pin 58 bearing on the wedge 62. This movement causes the pin 28 to enter the hollow of the hook 51 so as to lock the bars 122 and 122' together, which stay so locked as long as the lever 53 remains in the position of FIGS. 12 and 14. While this takes place spring 65 permanently tends to push the member 56, 57 backward and thus the pin 52 firmly into the hook 51 thereby compensating or taking up any play which may occur between the pin and hook.

In order to unlock the bars, the lever 53 will be turned whereby the eccentric 54 releases wedge 62 so that spring 66 will turn down the entire coupling component 55 about the pivot pin 61. Thus, the hook 51 will be released and the bar 122 can be turned about the hinge axle 24. When the levers 53 of all hinges are turned to the position of FIGS. 11 and 13, the ladder may be folded or coiled for storage or transportation. If only some of the levers are so turned, the ladder may be folded into other forms, as shown e.g. in FIG. 3.

Whereas the lock of FIGS. 11 to 15 requires the manipulation of a lever by the user's hand for the locking and releasing, the invention also contemplates the provision of a hinge locking device which is automatically operative to lock two adjoining bars when they are being turned from a folded into an aligned position, which, however, is manually operative to open the lock. FIGS. 16 to 19 illustrate a lock of the mentioned kind. In this case, the hinge elements 225 and 226 with axle or rung 24 are similar to the elements 125 and 126 in the preceding figures and are also affixed in a similar manner to the bars 222' and 222. As clearly seen in FIG. 19 the hinge element 226 consists of the symmetrically arranged part 230 and 231 between which the parts 228 and 229 of the element 225 engage. A plate shaped member 201 is located between the parts 228 and 229 and projects through a slot 202 into the bar 222' and with its hook-shaped end 203 beyond the ultimate end 204 of that bar. The other end 205 of plate 201 forms a hand grip outside the bar 222'. The member 201 is provided with two elongated slots 206 and 207 of which in FIG. 16 slot 206 is directed upwards from the axial hinge plane interiorly of the bar 222' whereas slot 207 is directed downwardly towards the axial hinge plane outside that bar. A pin 208 secured transversely inside the bar 222' engages the slot 206 whereas another pin 209 secured to the hinge parts 228, 229 engages the slot 207. Wire straps 210 are slung around pin 208 sideways of the plate 201 and extend rearward within the bar 222'. Their rearward ends 211 form hooks holding the rearward end of a compression spring 212 which bears with its forward end on a bulge 213 of the plate 201. In order to guide the plate properly, the hinge parts 228, 229 may be provided with small inwardly projecting buckles 214 which bear against the side respectively of the plate 201. The hook end 203 of the plate cooperates with a transverse pin 215 secured inside the bar 222 close to its hinged end. Now it will be seen that owing to the shape and position of the slots 206 and 207 and the engaging pins 208 and 209, respectively, the path of the hook 203 upon a movement of plate 201 will be a composite one tending to cause a shift of the hook substantially in the direction c. This lock operates in the following manner:

In the position of FIG. 17 when the bar 222 is turned down in respect to bar 222' and the hand lever 205 released, the plate 201 will be in a position pushed forward by spring 212 so that point 216 of the plate hits the inner face of the bar 222' as an abutment with the hook, of course, being disengaged. If now the bar 222 is being turned back into the aligned position, the pin 215 will strike the front face 217 of the hook 203 and push the whole plate 201 backward and the hook downward until the latter has cleared the pin 215 and now can be pushed forward and upwards by the spring 212 to engage with its hollow the pin 215. The spring, then, causes a wedging between the pin and the hook so as to eliminate any play between the two.

In order to open the lock, the hand lever 205 is to be pressed towards the bar 222' whereby the plate will move into the position of FIG. 17 in which the pin 215 and thus bar 222 will be released. The plate will return to its initial position upon the release of lever 205. If locking devices of the type illustrated in FIGS. 11 to 19 are used, it will be necessary only that they are provided in combination with each of the hinges or other kind of articulated joints of the one or the other one of the beams, on account of the rigid interconnection of both bars of each section of a ladder according to the invention. Furthermore, owing to an application of a locking device to each hinge it is possible to handle each section of the ladder individually according to the requirements of the various possible combinations and uses. Thus, the ladder may be used e.g. on a staircase with one set of sections longer than the other one, or as a work bench, an exhibition table, a ladder with working platform on its upper part, etc.

It will be apparent to those skilled in the art that many alterations and modifications of the structure shown and described may be made without departure from the essence and spirit of the invention which for that reason shall not be limited but by the scope of the appended claims.

I claim:

1. A ladder comprising a plurality of substantially equal sections, each section including two tubular side bars and a rung, a pair of hinges each including two hinge elements, respectively secured to a pair of adjacent bar ends of adjoining sections, each hinge element including a flange and a foot, said rung constituting the hinge axle and being passed through said flanges and axially non-shiftably secured to at least one of said hinge elements so as to maintain a predetermined spacing of the bars of each section, the foot of each hinge element being of concave shape so as to encompass a portion of the cross-section of the associated bar, a portion of the foot of each hinge element of one of said adjoining sections projecting from the end of the associated bar in the longitudinal direction thereof, and the adjoining bar end projecting from the foot of its associated hinge element and being adapted to engage in said projecting foot portion so that the latter constitutes a bed for the projecting bar end when the bars are aligned, and a locking means to hold adjoining bars in aligned position when turned into said position about the hinge axis, said locking means including a hook member and a pin member, one of said members being secured to the end of one of said adjacent bars interiorly thereof, said other member being movably held within the other one of said adjacent bars so as to project therefrom, a spring bearing on said other member and tending to move it into engagement with said first member when said adjacent bars are aligned, and a lever outside of said other bar and in cooperative relationship to said second member to move the latter out of engagement with said first member.

2. In a ladder as in claim 1, said hook being secured inside the end of one of said bars and projecting therefrom towards said other bar, said pin being part of a coupling component, said component being shiftably attached to said other bar within the end portion thereof and adapted to engage said hook with said pin for locking said bar ends together, spring means bearing on said coupling component and tending to hold said component in a non-engaging position, eccentric means bearing against said component with said pin from the hinged side of said other bar and being manually operative to urge said component into engagement with said hook against the restraint of said spring.

3. A ladder as in claim 2, said locking means further comprising a second spring bearing on said component so as to urge the latter backwards when in the hook-engaging position thereby to eliminate any play between said hook and said component.

4. A ladder as in claim 2, said coupling component comprising an elongated member with a first pin substantially in its median portion and a second pin at its front end and adapted to engage said hook, a third pin secured transversely inside said second bar and passing through an elongated slot provided in said member rearward of said first pin, said spring being arranged between said first pin and the wall of said second bar and tending to turn said member about said third pin with said second pin in a position out of engagement with said hook, a wedge-shaped plate side by side with said member and provided also with a longitudinal slot engaged by said third pin, said plate having an inclined edge on which said first pin bears, and a base edge against which said eccentric means bears, and a second spring between portions of said member and said plate tending to urge said member backwards in relation to said plate.

5. In a ladder having a plurality of alignable sections hinged pairwise together and including each two bars and a rung constituting the hinge axle, a releasable locking means for securing two adjoining tubular bars, one of each of two sections together when in aligned position, said means comprising a first transverse pin secured inside the end of one of said bars, a plate having a first portion inside the end portion of the second bar and projecting therefrom with a hook shaped end adapted to engage said first transverse pin, said plate having a second portion extending through a slot provided in the wall on the hinged side of said second bar and projecting rearward from said hinge axle so as to form a grip, said first plate portion being provided with a first elongated slot inclined with respect to the bar axis, said second plate portion being provided with a second inclined slot directed oppositely to said first slot, a second transverse pin secured in said second bar and engaging said first slot, a third pin secured to a stationary portion of said hinge outside said bar and forward of said grip projection and engaging said second slot, and a compression spring stationarily held with one of its ends inside said second bar and bearing with its other end against the rear of said first plate portion.

6. A ladder as in claim 5, said locking means further comprising in combination with said plate a plurality of wires slung about said second pin and extending rearward of said first plate portion, the rear ends of said wires being bent so as to constitute supports for the one end of said spring.

7. A ladder as in claim 5, wherein said first slot extends from the neighborhood of the slotted side of the second bar forward and towards the opposite side and said first transverse pin is located eccentrical in respect to the second bar axis on the side of the forward end of said first slot when the two bars are aligned.

8. A ladder as claimed in claim 5, wherein said hinge comprises two parallel plate-like elements secured to said second bar, said second plate portion being guided between said elements.

References Cited in the file of this patent

UNITED STATES PATENTS

| | | |
|---|---|---|
| 781,898 | McNaughton | Feb. 7, 1905 |
| 1,014,215 | Forndran | Jan. 9, 1912 |
| 1,639,009 | Singley | Aug. 16, 1927 |
| 2,012,592 | Skiba | Aug. 27, 1935 |
| 2,629,532 | Tupper | Feb. 24, 1953 |

FOREIGN PATENTS

| | | |
|---|---|---|
| 321,050 | Switzerland | June 15, 1957 |